(12) United States Patent
Mazloum et al.

(10) Patent No.: US 11,330,522 B2
(45) Date of Patent: May 10, 2022

(54) MULTI-CELL WAKE-UP SIGNAL CONFIGURATION

(71) Applicant: Sony Corporation, Tokyo (JP)

(72) Inventors: Nafiseh Mazloum, Lund (SE); Anders Berggren, Lund (SE); Basuki Priyanto, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 8 days.

(21) Appl. No.: 16/957,852

(22) PCT Filed: Jan. 24, 2019

(86) PCT No.: PCT/EP2019/051775
§ 371 (c)(1),
(2) Date: Jun. 25, 2020

(87) PCT Pub. No.: WO2019/145437
PCT Pub. Date: Aug. 1, 2019

(65) Prior Publication Data
US 2021/0022077 A1    Jan. 21, 2021

(30) Foreign Application Priority Data
Jan. 26, 2018 (SE) .................................. 1830028-5

(51) Int. Cl.
| | |
|---|---|
| *H04L 12/24* | (2006.01) |
| *H04W 72/12* | (2009.01) |
| *H04W 52/02* | (2009.01) |
| *H04L 5/00* | (2006.01) |
| *H04L 41/0803* | (2022.01) |

(52) U.S. Cl.
CPC ....... *H04W 52/0235* (2013.01); *H04L 5/0048* (2013.01); *H04L 41/0803* (2013.01); *H04W 72/12* (2013.01)

(58) Field of Classification Search
CPC .............. H04W 52/0235; H04W 72/12; H04L 5/0048; H04L 41/0803
USPC ........................................................ 370/311
See application file for complete search history.

(56) References Cited

U.S. PATENT DOCUMENTS

| | | | |
|---|---|---|---|
| 6,360,327 B1 * | 3/2002 | Hobson ................. | G06F 1/3203 710/15 |
| 2010/0103848 A1 | 4/2010 | Chin et al. | |
| 2010/0317374 A1 * | 12/2010 | Alpert ................... | H04W 68/02 455/458 |
| 2015/0230169 A1 * | 8/2015 | Hood ............... | H04B 10/25753 370/311 |

(Continued)

OTHER PUBLICATIONS

International Search Report and Written Opinion from corresponding International Patent Application No. PCT/EP2019/051775, dated Mar. 22, 2019, 9 pages.

(Continued)

*Primary Examiner* — Angel T Brockman
(74) *Attorney, Agent, or Firm* — Tucker Ellis LLP

(57) ABSTRACT

A method of operating an access node (112) of a sub-area (161) of a communication network (100) includes transmitting configuration data (4001) for wake-up signal (700, 711, 712, 4003) transmission in the sub-area (161) and in at least one further sub-area (162-168) of the communication network (100).

20 Claims, 13 Drawing Sheets

(56) References Cited

U.S. PATENT DOCUMENTS

2017/0048918 A1     2/2017   Iwamura et al.
2020/0103848 A1     4/2020   McCarley et al.

OTHER PUBLICATIONS

Huawei et al., "Discussion on potential RRM impact from recent RAN1 progress", 3GPP TSG-RAN WG4 Meeting No. #85, R4-1713326, Nov. 27-Dec. 1, 2017, 5 pages.
Intel Corporation, "WUS consideration for efeMTC", 3GPP TSG-RAN WG2 Meeting No. #99bis, R2-1710641, Oct. 9-13, 2017, 7 pages.
LG Electronics, "Discussion on power saving signal/channel in MTC", 3GPP TSG-RAN WG1 Meeting 90 bis, R1-1717279, Oct. 9-13, 2017, 12 pages.

* cited by examiner

MULTI-CELL WAKE-UP SIGNAL CONFIGURATION

TECHNICAL FIELD

Various examples of the invention generally relate to configuring wake-up signal transmission. Various examples of the invention specifically relate to configuring wake-up signal transmission for a plurality of sub-areas of a communication network.

BACKGROUND

Wireless communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up techniques. Here, a terminal/user equipment (UE) may include two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. Then, the low-power receiver can receive the wake-up signal (WUS) and, in response to receiving the WUS, the main receiver can transition again to the active state. Payload data may be transmitted and/or received (communicated) by the main receiver.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR". See 3GPP TSG RAN WG2 #99 R2-1708285.

However, such reference implementations of WUS techniques are subject to certain restrictions and drawbacks. For example, it is possible that UE mobility occurs while operating one or more receivers of the UE in the inactive state such as an RRC idle state. Once the respective receiver is transitioned into the active state, according to reference implementations, it is then required to identify a cell identity of the respective cell in the proximity of the UE; this is typically achieved by receiving broadcasted information blocks from the respective serving base station (BS). Based on reference signals, it is also possible to perform channel sensing in order to verify that the signal quality provided by the serving BS is sufficient.

Channel sensing and identification of the cell identity can require significant energy. For example, if channel sensing and identification is required prior to reception of a WUS, the energy balance can be negatively affected. This may be a problem in connection with IOT or MTC UEs which are typically battery powered and, therefore, require low energy consumption. Additionally, such tasks may require significant time, thereby increasing the latency of any subsequent data communication.

SUMMARY

Therefore, a need exists for advanced techniques of WUS transmission. Specifically, a need exists for techniques which overcome or mitigate at least some of the above-identified restrictions and drawbacks.

A method of operating a access node of a sub-area of a communication network includes transmitting configuration data. The configuration data is for wake-up signal transmission in the sub-area and in at least one further sub-area of the communication network.

A access node of a sub-area of a communication network includes control circuitry. The control circuitry is configured to transmit configuration data. The configuration data is for wake-up signal transmission in the sub-area and in at least one further sub-area of the communication network.

A computer program product or computer program includes program code. The program code may be executed by control circuitry. Executing the program code can cause the control circuitry to perform a method of operating a access node of a sub-area of a communication network. The method includes transmitting configuration data for wake-up signal transmission in the sub-area and in at least one further sub-area of the communication network.

A method of operating a terminal includes receiving configuration data. The configuration data is received from a access node of a sub-area of a communication network. The configuration data is for wake-up signal transmission in the sub-area and in at least one further sub-area of the communication network.

The terminal includes control circuitry. The control circuitry is configured to receive configuration data from a access node of a sub-area of a communication network. The configuration data is for wake-up signal transmission in the sub-area and in at least one further sub-area of the communication network.

A computer program product or computer program includes program code that may be executed by control circuitry. Executing the program code causes the control circuitry to perform a method of operating a terminal. The method includes receiving, from a access node of a sub-area of a communication network, configuration data for wake-up signal transmission in the sub-area and at least one further sub-area of the communication network.

For example, the communication network may be implemented by a wireless network such as a cellular network; here, the various sub-areas may correspond to cells and the access nodes may be implemented by BSs. The sum of sub-areas is typically referred to as coverage area of the communication network.

The various aspects described above can be combined in further aspects. For example, techniques executed by the UE may be inter-related to the techniques executed by the access node.

DETAILED DESCRIPTION OF EMBODIMENTS

Figure 1:
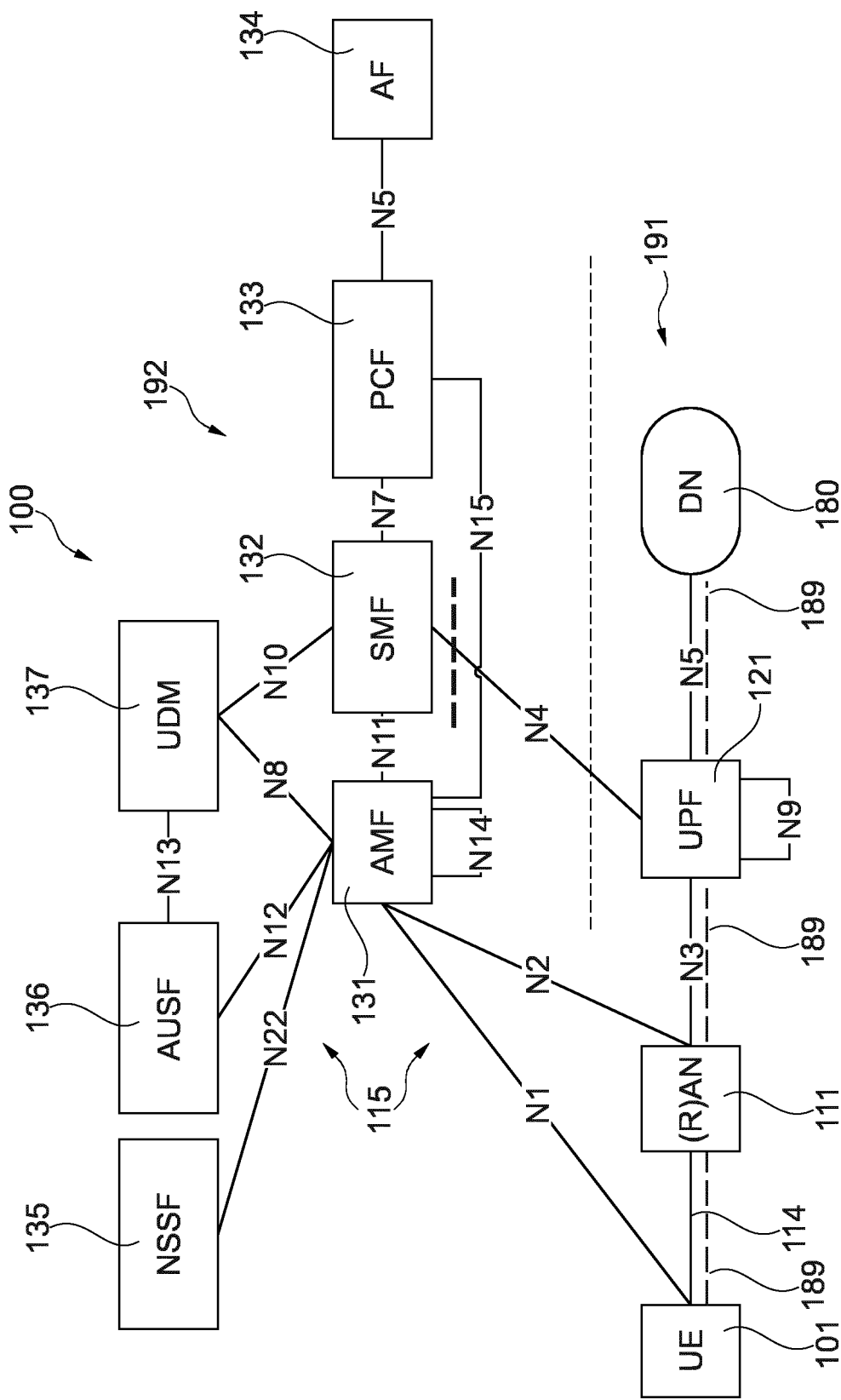
FIG. 1 schematically illustrates a cellular network including a core network and a radio access network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wirelessly communicating using a communication network are described. The communication network may be a wireless network. For sake of simplicity, various scenarios are described hereinafter with respect to an implementation of the communication network by a cellular network. The cellular network includes multiple cells. Each cell corresponds to a respective sub-area of the overall coverage area. Other example implementations include a multi-area wireless network such as a cellular WiFi network, etc.

Hereinafter, WUS techniques are described. The WUS techniques enable a UE to transition a main receiver into a low-power state, e.g., for power-saving purposes. In some examples, the low-power state of the main receiver may be an inactive state.

The inactive state can be characterized by a significantly reduced power consumption if compared to an active state of the main receiver. For example, the main receiver may be unfit to receive any data in the inactive state such that some or all components may be shut down. Wakeup of the main receiver from the inactive state is then triggered by a WUS. The inactive state can be associated with various operational modes of the UE, e.g., a disconnected mode or idle mode.

For example, the WUS may be received by a dedicated low-power receiver of the UE. The WUS may have a comparably simple modulation, e.g., On-Off Keying or the like, which facilitates a simple time-domain operation by the low-power receiver. For example, non-coherent decoding may be possible. For non-coherent decoding, knowledge of a reference phase is not required for signal detection. In other examples, the WUS may be received by the main receiver in the low-power state. Here, it may not be required to provision a dedicated low-power receiver.

The low-power receiver and main receiver may be implemented within the same hardware component(s) or may be implemented by at least one different hardware component.

The WUS may help to avoid blind decoding of a control channel on which paging signals and/or paging messages are communicated. Since typically such blind decoding is comparably energy inefficient, thereby, power consumption can be reduced by using WUSs. This is explained in greater detail hereinafter: For example, in the 3GPP scenario, during paging occasions (POs), the UE is expected to blind decode the control channels MPDCCH (for Machine Type Communication) or PDCCH (for LTE) or NPDCCH (for NB-IOT) for P-RNTI as paging identity.

If presence of a paging indicator including the P-RNTI is detected, the UE continues to decode a subsequent data shared channel (PDSCH) for a paging message. However, the paging message on PDSCH may be indicative of paging of other UEs, and not for the given UE. In this case, the given UE needs to go back to sleep until the next PO. Moreover, in applications where the paging rate is very low, the cost of UE idle listening can become very high relatively. Under this condition, the UE needs to monitor the control channel without receiving any paging indication and/or a false paging indication for another UE. In MTC, it could be even worse as the respective MPDCCH control channel is transmitted with the highest number of repetitions which reflect the maximum extended coverage used in that cell. By provisioning at least a part of the WUS in a UE-related manner, the UE may be aware of the potential of subsequent paging without a need of blindly decoding paging signals. This reduces power consumption.

Communication of the WUS may be time-aligned with a discontinuous reception (DRX) cycle of the UE. General techniques of discontinuous reception are, for example, described in 3GPP TS 36.331, Version 14.0.0, and 3GPP 36.304 Version 14.0.0.

Sometimes, the operational mode of the UE associated with WUS communication is referred to as WUS mode. As a general rule, there may be multiple WUS modes available, e.g., modes in which the UE is registered at the network as connected or idle, etc.

Various techniques are based on the finding that energy consumption of the UE should be limited when mobility occurs while operating in a WUS mode. Specifically, in reference implementations, a UE can be configured by a DRX cycle. When mobility occurs, according to such reference implementations, the UE can be required to activate the main receiver in advance for performing channel sensing, e.g., measuring the signal strength or signal quality, on broadcasted information block of the particular cell on which the UE camps after mobility (serving cell) and/or for receiving cell related information from such broadcasted information block(s). Such a scenario is sometimes referred to as a mobility measurements and in idle mode. To obtain information on suitable cells for mobility measurements, neighbor cell information is conventionally included in a system information block broadcasted in each cell. A UE may select a suitable cell from a corresponding cell list in the system information block for camping. Again, to perform channel sensing for one or more neighbor cells, it may be required to activate the main receiver. This can increase the power consumption. Likewise, a fallback to a paging procedure—instead of a WUS procedure—in case of mobility is energy inefficient.

According to various examples, WUS transmission is facilitated for mobility scenarios. Specifically, according to various examples, it is possible to distribute configuration data for WUS transmissions occurring in multiple cells. For example, it would be possible to distribute the configuration data for WUS transmissions in the serving cell and in neighboring cells, to thereby support mobility in a cellular network which supports WUS transmission.

According to examples, a BS transmits the configuration data for the WUS transmission in its serving cell and in at least one further cell of the cellular network. The terminal can then receive the configuration data from the BS. For example, the at least one further cell may be adjacent to the serving cell. Hence, the configuration data may be referred to as multi-cell configuration data.

For example, the configuration data may be broadcasted by the BS, e.g., as a system information block.

The configuration data may be cell specific. Hence, different configurations for the WUS transmission may be used in the cell and the at least one further cell. For example, different configurations may be employed for different further cells. For example, a first configuration for the WUS transmission may be employed in a first further cell and a second configuration for the WUS transmission may be employed in a second further cell. This gives flexibility in the configuration of the WUS transmission; thereby, mobility is supported.

As a general rule, the particular kind and type of configuration indicated by the configuration data is not limited. For example, time-frequency resources, a schedule including a time pattern or frequency pattern, a sequence design of the WUSs used in the various cells, etc. may be indicated by the configuration data.

For example, the configuration data may be indicative of a partition of the WUS: According to various examples, the configuration data may indicate that the WUS includes a first part and a second part. For example, the first part may implement a preamble. It is possible that the first part is related to the cell of the BS which transmits the respective WUS. For example, the first part may be cell-specific. The first part may include a reference signal. Differently, the second part may be related to the one or more UEs to which the WUS is directed. For example, the WUS could be directed to one UE or a group of UEs. As such, the second part may be UE-specific. The second part of the WUS may include a respective identifier indicative of the identity of the one or more UEs. The second part may facilitate UE-selective wakeup.

Depending on the configuration data, the first part and the second part may be transmitted in direct succession, i.e., without any further symbols in-between, etc.; or there may be a time gap between the first part and the second part, e.g., a guard interval. For example, the time gap between the first part and the second part may not be larger than 5 ms, optionally not larger than 0.5 ms, this may be specified by the configuration data. The first part and the second part may be arranged at a predefined time-frequency offset. Thus, the first part and the second part may be repeatedly transmitted at the same repetition rate or at different repetition rates, this may be specified by the configuration data. The first part and the second part may reside at the same frequency or at different frequencies.

By implementing such a two-part WUS, it is possible to include certain functionality in the first part of the WUS that goes beyond mere wakeup of the UE by the second part. For example, it would be possible that the first part includes a cell identity of the cell associated with the transmitting BS, and/or a reference signal for channel sensing; and/or a synchronization signal for synchronization between the UE and the BS. Hence, in other words, it is possible that the first part consists of the reference signal; or the synchronization signal; or the cell identity. To this end, the first part WUS may be simply referred to as reference signal; or synchronization signal; etc.

Channel sensing may help to identify a power level of communication on the respective channel. The power level may be used to determine whether the radio signal quality is good enough for the UE to attempt to utilize the cell or if the UE should continue trying to find another suitable cell. As such, channel sensing may facilitate determining Reference Signal Received Power (RSRP) and/or Reference Signal Received Quality (RSRQ). This facilitates the mobility measurements.

Thereby, the UE may rely on the first part of the WUS for identifying the particular cell on which it is camping on, performing channel sensing, and/or synchronizing with the BS, or generally any mobility measurement. Together with the multi-cell configuration data, this renders it unnecessary to receive any broadcasted information blocks and/or broadcasted reference signals and/or broadcasted synchronization signals. Rather, the UE may rely on the first part of the WUS exclusively and may not need to activate the main receiver for mobility measurements. Thereby, energy consumption and latency is reduced. For example, in the 3GPP LTE framework, it may not be required to receive broadcasted 3GPP primary synchronization signals (PSSs) and secondary synchronization signals (SSSs); see 3GPP TS 36.211, Version 14.0.0 (2016-09), section 6.11.

For example, the configuration data may be indicative of the WUS transmission with respect to the first part; in some scenarios, it may not be required to include such multi-cell configuration data with respect to the second part of the WUS. This may be specifically applied where the multi-cell configuration data is for facilitating mobility and, specifically, mobility measurements for cell re-selection.

As will be appreciated from the above, depending on the particular type of configuration for the WUS transmission, the configuration data can include varying information.

For example, the configuration data could be indicative of support of the WUS transmission by the cell and the at least one further cell. For example, some cells of the cellular network may support WUS transmission while other cells of the cellular network may not support WUS transmission. For example, it would be possible that the configuration data includes an indicator indicative of the support of the WUS transmission for each covered cell. For example, the indicator may be a 1-bit flag per cell.

For example, the configuration data may be indicative of time-frequency resources used for the WUS transmission in the cell and the at least one further cell. Here, generally, different cells of the cellular network may use different time-frequency resources. Hence, the configuration data can be indicative of the WUS resource allocation.

The configuration data could be indicative of a schedule of the time-frequency resources, at least for some of the cells of the cellular network. For example, the configuration data could be indicative of a periodicity of corresponding WUS occasion (WO). The schedule may be indicative of a time pattern of the time-frequency resources. For example, a timing reference may be provided. For example, the sequence identity of transmission frames of the wireless links supported by the various cells may be used as a timing reference.

The time pattern could be required for the UE to be aware of the time instance of the WOs. The time pattern could be indicated as a relation between WOs and POs. Hence, as a general rule, the schedule may be defined with respect to paging signal transmission in the cell and the at least one further cell. For example, it would be possible to indicate the time advance of a WO with respect to a subsequent PO. Alternatively or additionally, it would be possible to use transmission frame timing as a timing reference, the transmission frame timing being defined with respect to the transmission frames of the respective wireless links. Alternatively or additionally, a periodicity could be indicated, if the WUS transmissions are implemented with a certain specific periodicity. As mentioned above, for multi-part WUSs—e.g., including a cell-specific first part and a UE-specific second part—the timing pattern may be indicative of the time relation between the first part and the second part.

The schedule may be indicative of a frequency pattern of the time-frequency resources. For example, the frequency pattern i.e., a cyclic shift of the frequency used for the WUS transmission, would be possible.

A frequency pattern may facilitate identifying the frequency allocations of the WUS transmission at the UE. Again, the frequency pattern may be provided as an absolute value or a relative value. Provided as a relative value, reference can be made with respect to other control signals, e.g., POs.

As a general rule, it is not required that the configuration data includes all information for all cells. For example, the configuration data can be indicative of more information for the serving cell if compared to the at least one further cell, or vice versa.

Further, as a general rule, the configuration data may be provided for a subset of all cells of the cellular network. For example, the cell and the at least one further cell may define a tracking area of the cellular network.

As mentioned above, the configuration data may be broadcasted in an information block, e.g., together with further information or in a dedicated information-field. This can further limit the required control signaling overhead. In another scenario, it would also be possible that the configuration data is transmitted in one-to-one communication between the BS and the UE. UE-specific control signaling can be implemented. For example, dedicated control signaling, i.e., one-to-one control signaling may be used. For example, Layer 3 control signaling, i.e., Radio Resource Control (RRC) control signaling can be implemented while the UE is in an active mode. This helps to accommodate for a large information. For example, the configuration data could be transmitted to all UEs or selectively to those UEs which have WUS capability.

A WUS can include an identity associated with the respective cell. For example, the identity may be included in a first part of a multi-part WUS, the first part being cell-specific. Such an identity could be provided in the configuration data for the current active cell, and optionally for the at least one further cell. This helps to match the received WUS with a respective cell, thereby facilitating mobility.

To avoid increased control signaling overhead, it can be helpful to compress the configuration data. Here, it would be possible to pre-define a set of candidate configurations, e.g., as a fixed rule set or based on the negotiation between the UE and the network. Then, it would be possible that the configuration data is indicative of a selected configuration for the WUS transmission, the selected configuration being selected from the predefined set of candidate configurations. A corresponding index mapping scheme may be implemented. Typically, only a limited number of bits, e.g., 1-10 bits, may be required to uniquely identify the selected configuration from the predefined set of candidate configurations.

In the various scenarios described herein, the UE may make different use of the multi-cell configuration data. Various use cases are conceivable. For example, mobility measurements and/or a cell re-selection may be supported. For example, the UE may be configured to listen for the WUS transmission in the at least one further cell in accordance with the configuration data. Then, based on said listening, the channel quality of the channel between the UE and the further BS of the at least one further cell can be estimated. This may correspond to a mobility measurement. Specifically, an initial/coarse estimation of the channel quality may be facilitated by the WUS transmission of the at least one further cell. Further channel sensing may follow. The initial channel sensing based on the WUS transmission may be used as an indication of whether there is a good probability for being able to detect system information broadcasted by the at least one further cell. For example, if a UE activates its low-power receiver but cannot receive the WUS of the previously serving cell, it is possible to continue searching for the WUS transmission of the at least one further cell in accordance with the configuration data. Hence, the UE can optimize its mobility measurements, e.g., by selectively searching for broadcast system information of one or more cells for which a sufficiently good channel quality has been estimated based on the WUS transmission. This helps to reduce energy consumption of the UE when mobility occurs.

FIG. 1 schematically illustrates a cellular network 100. The example of FIG. 1 illustrates the network 100 according to the 3GPP 5G architecture. Details of the fundamental architecture are described in 3GPP TS 23.501, version 1.3.0 (2017-09). While FIG. 1 and further parts of the following description illustrate techniques in the 3GPP 5G framework, similar techniques may be readily applied to different communication protocols. Examples include 3GPP LTE 4G and IEEE Wi-Fi technology.

In the scenario of FIG. 1, a UE 101 is connectable to the network 100. For example, the UE 101 may be one of the following: a cellular phone; a smart phone; and IOT device; a MTC device; a sensor; an actuator; etc.

The UE 101 is connectable to the network 100 via a radio access network (RAN) 111, typically formed by one or more BSs (not illustrated in FIG. 1). A wireless link 114 is established between the RAN 111—specifically between one or more of the BSs of the RAN 111—and the UE 101.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; NAS termination; connection management; reachability management; mobility management; access authentication; and access authorization the AMF 131 can negotiate an NAS-level security context with the UE 101. See 3GPP TS 23.501 version 1.3.0 (2017-09), section 6.2.1. For example, the AMF 131 controls CN-initiated paging of the UEs 101 if the respective UE 101 operates in RRC idle mode. The AMF 131 may keep track of the timing of a DRX cycle of the UE 101. The AMF 131 may trigger transmission of wakeup and/or paging of the UE 101.

A data connection 189 is established by the AMF 131 if the respective UE 101 operates in a connected mode. To keep track of the current mode of the UEs 101, the AMF 131 sets the UE 101 to ECM connected or ECM idle. During ECM connected, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving UE.

FIG. 1 also illustrates aspects with respect to a data connection 189. The data connection 189 is established between the UE 101 via the RAN 111 and the DP 191 of the CN 115 and towards the DN 180. For example, a connection with the Internet or another packet data network can be established. To establish the data connection 189, it is possible that the respective UE 101 performs a random access (RACH) procedure, e.g., in response to reception of network paging and, optionally, a preceding wakeup. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model of Layer 2.

Figure 2:
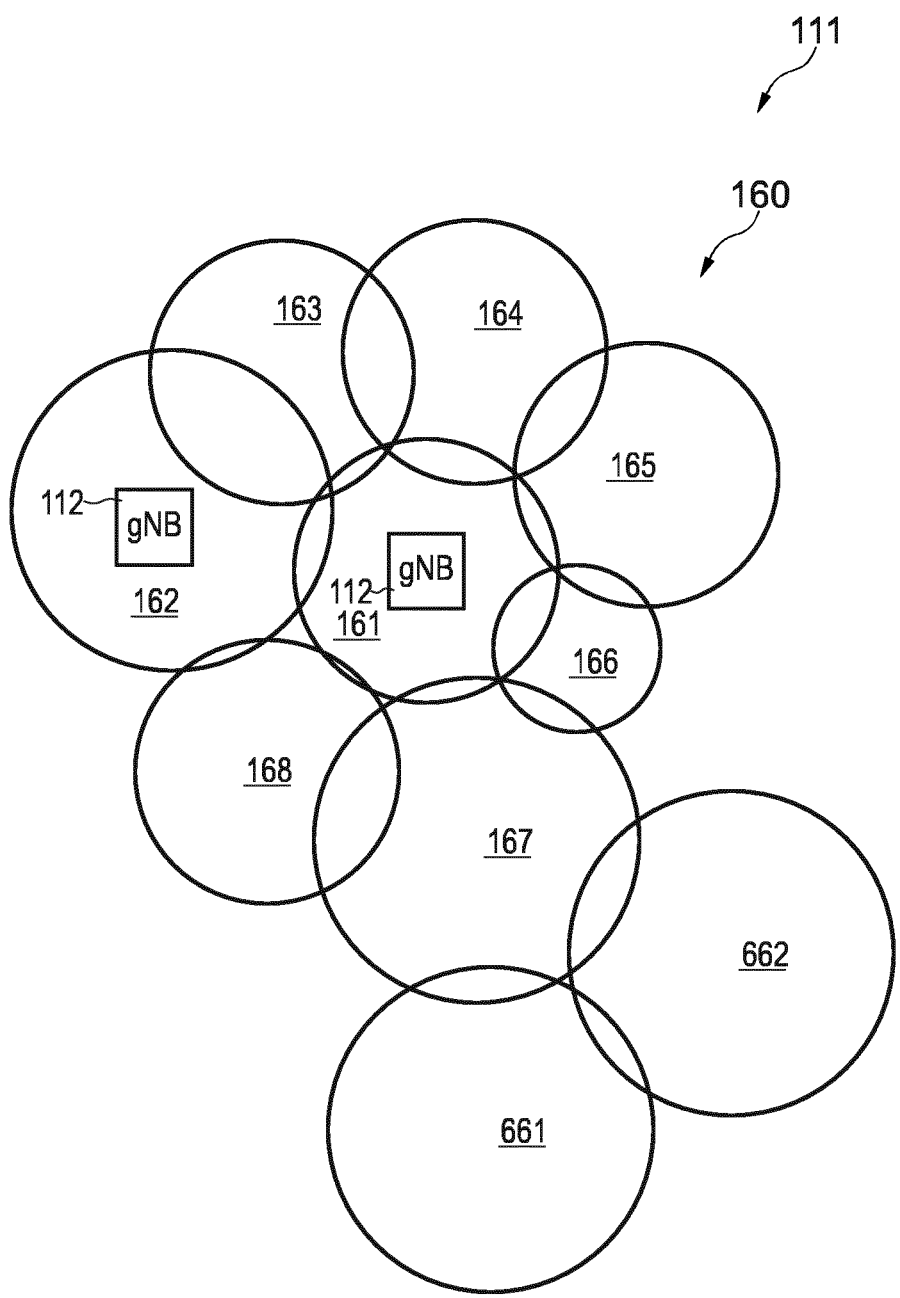
FIG. 2 schematically illustrates the radio access network of the cellular network in greater detail.

FIG. 2 illustrates aspects with respect to the RAN 111 of the cellular network 100. Specifically, FIG. 2 illustrates multiple cells 161-168 of the RAN 111. BSs 112 are illustrated for the cells 161 and 162 (in FIG. 2, the BSs 112 are labeled gNB in accordance with the 3GPP 5G terminology). The remaining cells 163-168 are also served by one or more BSs 112 (not illustrated in FIG. 2 for sake of simplicity). Cells 661, 662 are not adjacent to the cell 161.

As will be appreciated from FIG. 2, the cells 162-168 are neighboring cells of the cell 161. For example, if, initially, the cell 161 is the serving cell of the UE 101, then mobility may occur; due to the mobility, the UE moves into one of the neighboring cells 162-168.

In the scenario of FIG. 2, the cells 161-168, 661, 662 define a tracking area 160. The network 100 is configured to provide paging of the UE 101 throughout the cells 161-168, 661, 662 of the tracking area 160. The AMF 131 may contact the respective BSs 112. Alternatively or additionally, the network 100 can be configured to provide WUS transmission for the UE 101 throughout the cells 161-168, 661, 662 of the tracking area 160.

Figure 3:
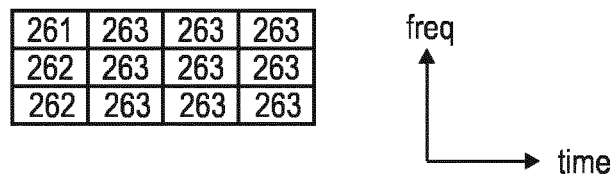
FIG. 3 schematically illustrates time-frequency resources of multiple channels used for WUS transmission, paging signal transmission, and payload message transmission according to various examples.

FIG. 3 illustrates aspects with respect to channels 261-263 implemented on the wireless link 114. The wireless link 114 implements a plurality of communication channels 261-263. Transmission frames—e.g., implemented by radio frames, each including one or more subframes—of the channels 261-263 occupy a certain time duration. Each channel 261-263 includes a plurality of time-frequency resources which are defined in time domain and frequency domain. For example, the resources may be defined with respect to symbols encoded and modulated according to Orthogonal Frequency Division Multiplexing (OFDM). The resources may be defined in a time-frequency resource grid.

For example, a first channel 261 may carry WUSs. The WUSs enable the network 100—e.g., the AMF 131—to wakeup the UE 101 when the UE 101 is in a respective idle mode. The WUSs may thus be communicated in dedicated resources of the channel 261.

A second channel 262 may carry paging signals or paging indicators which enable the network 100—e.g., the AMF 131 (or a MME in the 3GPP LTE framework)—to page the UE 101 when the UE 101 is in a respective idle mode. The paging signals or paging indicators may thus be communicated in dedicated resources of the channel 262. Typically, the paging indicators are communicated on PDCCH As will be appreciated from the above, the WUSs and the paging signals may be different from each other in that they are transmitted on different channels 261, 262. Different resources may be allocated to the different channels 261-263. For example, in many scenarios the WUS and the paging signals are transmitted in two different time instances.

Further, a third channel 263 is associated with a payload messages carrying higher-layer user-plane data packets associated with a given service implemented by the UE 101 and the BS 112 (payload channel 263). User-data messages may be transmitted via the payload channel 263. Alternatively, control messages may be transmitted via the channel 263, e.g., a paging message.

Figure 4:
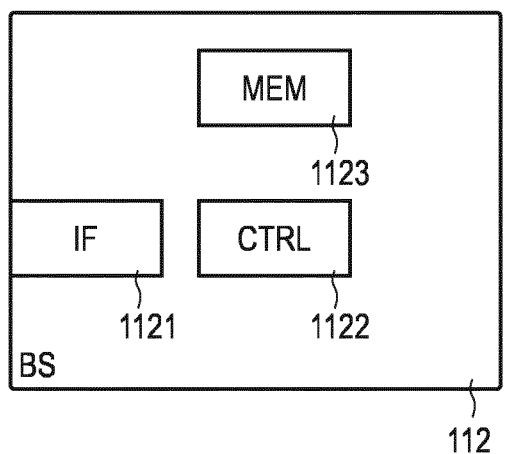
FIG. 4 schematically illustrates a BS of the radio access network according to various examples.

FIG. 4 schematically illustrates the BS 112. The BS 112 includes an interface 1121. For example, the interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: transmitting configuration data for WUS transmission in multiple cells; transmitting WUSs; and/or generating WUS including a first part and a second part; etc.

Figure 5:
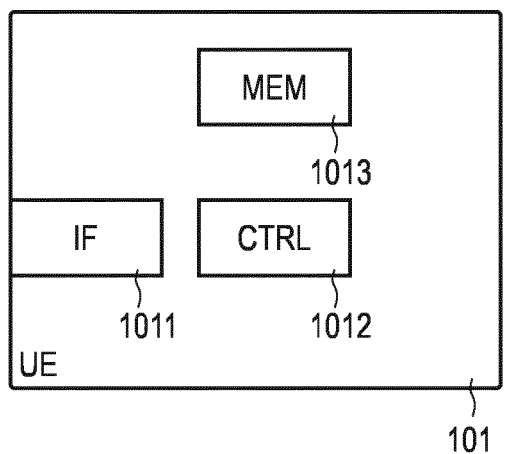
FIG. 5 schematically illustrates a UE according to various examples.

FIG. 5 schematically illustrates the UE 101. The UE 101 includes an interface 1011. For example, the interface 1011 may include an analog front end and a digital front end. In some examples, the interface 1011 may include a main receiver and a low-power receiver. Each one of the main receiver and the low-power receiver may include an analog front end and a digital front end, respectively. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: receiving configuration data for WUS transmission in multiple cells; receiving WUSs; transitioning the main receiver between an inactive state and an active state; implementing a DRX cycle of the main receiver and/or of the low-power receiver; synchronizing with a BS based on a first part of WUS; channel sensing based on a first part of a WUS and in accordance with the configuration data; performing mobility measurements based on WUSs; etc.

Figure 6:
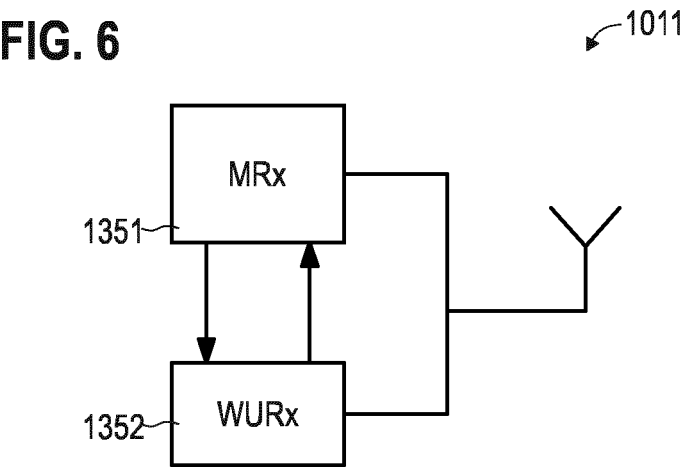
FIG. 6 schematically illustrates receivers of the UE according to various examples.

FIG. 6 illustrates details with respect to the interface 1011 of the UE 101. In particular, FIG. 6 illustrates aspects with respect to a main receiver 1351 and a low-power receiver 1352. In FIG. 6, the main receiver 1351 and the low-power receiver 1352 are implemented as separate entities. For example, they may be implemented on different chips. For example, they may be implemented in different housings. For example, they may not share a common power supply.

The scenario FIG. 6 may enable switching off some or all components of the main receiver 1351 when operating the main receiver in inactive state. In the various examples described herein, it may then be possible to receive WUSs using the low-power receiver 1352. Also, the low-power receiver 1352 may be switched between an inactive state and an active state, e.g., according to a DRX cycle.

For example, if the main receiver 1351 is switched on, the low-power receiver 1352 may be switched off, and vice-versa. As such, the main receiver 1351 and the low-power receiver 1352 may be inter-related in operation (indicated by the arrows in FIG. 6).

Figure 7:
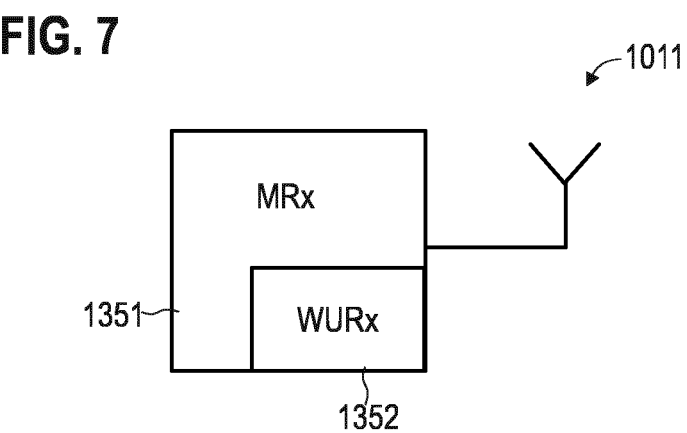
FIG. 7 schematically illustrates receivers of the UE according to various examples.

FIG. 7 illustrates details with respect to the interface 1011 of the UE 101. In particular, FIG. 7 illustrates aspects with respect to the main receiver 1351 and the low-power receiver 1352. In FIG. 7, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 7 may enable a particular low latency for transitioning between reception—e.g., of a WUS—by the low-power receiver 1352 and reception by the main receiver 1351.

While in FIGS. 6 and 7 a scenario is illustrated where the main receiver 1351 and the low-power receiver 1352 share a common antenna, in other examples, it would be also possible that the interface 1011 includes dedicated antennas for the main receiver 1351 and the low-power receiver 1352.

While in the examples of FIGS. 6 and 7 scenarios are illustrated where there is a dedicated low-power receiver 1352, in other examples there may be no low-power receiver. Instead, the WUS may be received by the main receiver 1351 in a low-power state. For example, the main receiver 1351 may not be fit to receive ordinary data other than the WUS in the low-power state. Then, in response to receiving the WUS, the main receiver 1351 may transition into a high-power state in which it is fit to receive the ordinary data, e.g., on channel 263, etc.

Figure 8:
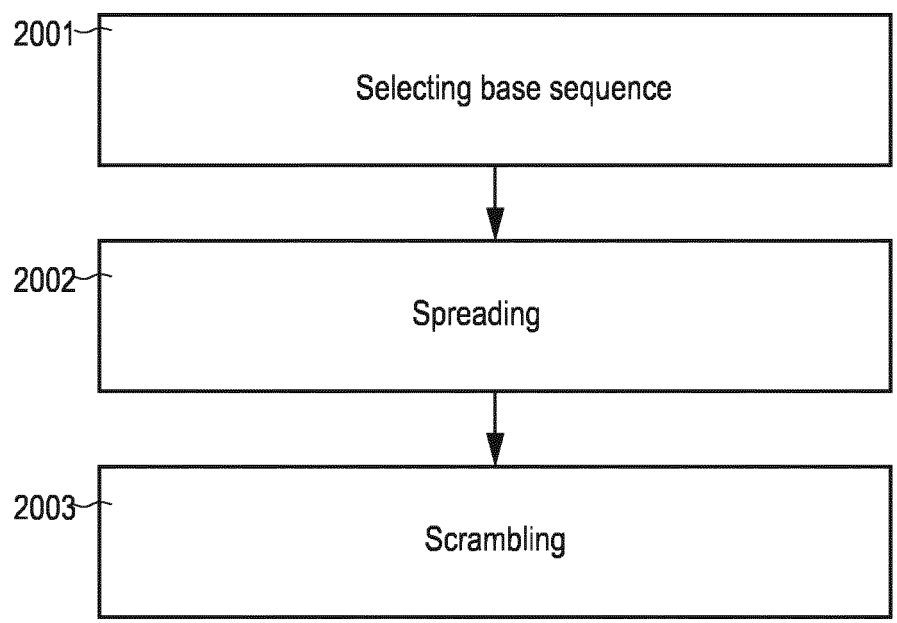
FIG. 8 is a flowchart of a method according to various examples, wherein the method is for generating of WUSs.

FIG. 8 is a flowchart of a method according to various examples. FIG. 8 illustrates aspects with respect to constructing or generating the WUS. Specifically, the method according to FIG. 8 may be used for generating a first part of the WUS and/or a second part of the WUS.

For example, the method according to FIG. 8 could be executed by the control circuitry 1122 of the BS 112. FIG. 8 illustrates aspects with respect to a sequence design of the WUS. In the various examples described herein, it may be possible to construct the WUSs according to the method of FIG. 8.

First, a certain base sequence is selected, 2001. For example the base sequence may be a randomly generated set of bits. For example the base sequence may be unique for a UE or a group of UEs. For example, the base sequence may be unique for a cell 161-168 of the network 100. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to sequence design of the WUS. For example, setting the sequence length of the base sequence of the WUS can be subject to sequence design of the WUS. Selecting the base sequence can be subject to sequence design of the WUS.

In some examples, it would be possible that different base sequences are selected for a first part of the WUS and a second part of the WUS. For example, the base sequence selected for the first part of the WUS may be related to a cell 161-168 of the BS transmitting the WUS, e.g., indicative of a cell identity. Differently, the base sequence of the second part of the WUS may be related to one or more UEs to which the WUS is directed, e.g., based on identities of the UEs.

In some examples, different base sequences may be selected for different WUSs—specifically, for the second parts of the WUSs. In particular, the base sequence may be selected based on an intended recipient of the WUS, i.e., depending on the particular UE 101 to which the WUS is to be transmitted. In other words, it may be possible that the base sequence is uniquely associated with the respective UE 101 as the intended recipient of the WUS. Different UEs may be addressed by different base sequences. Hence, the base sequence may also be referred to as identity code. Thereby, it may be possible to implement, e.g., the second part of the WUS to be UE-related.

In some examples, different base sequences may be selected for different WUSs—specifically, for the first parts of the WUSs. In particular, the base sequence may be selected based on an originator of the WUS, i.e., depending on the particular BS 112 which transmits the WUS. In other words, it may be possible that the base sequence is uniquely associated with the respective BS 112 as the originator of the WUS. Thereby, different cells 161-168 may use different WUSs. Different BSs or cells 161-168 may be identified by different base sequences. Hence, the base sequence may also be referred to as identity code. Thereby, it may be possible to implement, e.g., the first part, of the WUS to be cell-related. A reference signal may be implemented, which is cell-related. This supports WUS-based mobility measurements.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the WUS.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the WUS.

In some examples, it may be possible to additionally add a checksum to the WUS. Adding a checksum may be subject to sequence design of the WUS. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc. The checksum may provide for joint error detection and, optionally, correction capability across the entire length of the WUS, i.e., across multiple parts of the WUS.

In some examples, it may be possible to add a preamble to the WUS. The preamble may include a sequence of preamble bits. For example, the sequence of preamble bits may have a specific length. The sequence of preamble bits may enable robust identification of the WUS, e.g., even in presence of burst errors, etc. Presence of the preamble, length of the preamble, and/or type of the preamble sequence, etc. can be properties that can be set according to a preamble parameter in sequence design of the WUS.

According to examples, different cells may rely on different sequence design configurations. The sequence design configuration may be indicated by the multi-cell configuration data for multiple cells. This facilitates WUS-based mobility measurements.

According to various examples described herein, one or more sequence design configurations of the method according to the example of FIG. 8 can be set differently for different parts of the WUS. For example, a different sequence design configuration may be set for the first part if compared to the second part of a WUS. For example, a more robust sequence design configuration may be set for the first part if compared for the second part; this may include a longer base sequence, and/or a longer checksum, and/or a longer scrambling code; etc. This may facilitate reliable reception of the first part, even without previous synchronization and/or channel sensing. This facilitates WUS-based mobility measurements. The second part may then be received based on synchronization and/or channel sensing obtained from the first part; thus, it may not be required to apply such a high level of protection to the second part as for the first part. This reduces overhead.

Figure 9:
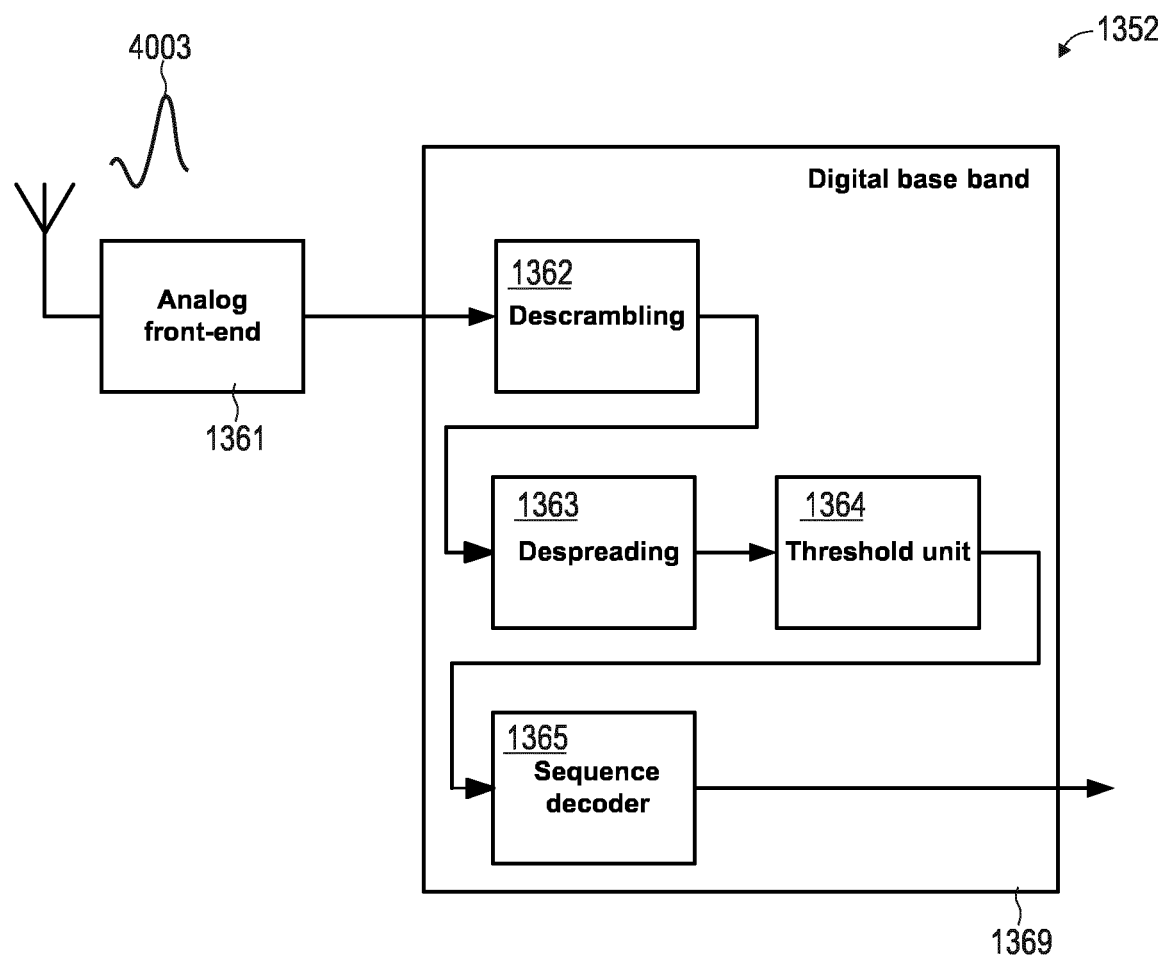
FIG. 9 schematically illustrates receiving of WUSs according to various examples.

FIG. 9 illustrates aspects with respect to the processing of a WUS 4003 received by the low-power receiver 1352. The analog front end 1361 outputs a bit sequence corresponding to the WUS 4003 in the baseband to the digital front end 1369.

Generally, the various processing blocks indicated in FIG. 9—and, as such, also the inter-related processing blocks at the transmitter, cf. FIG. 8—are optional. It is not required that for all parts of a WUS all processing blocks are executed. Different processing blocks may be executed for different parts of a WUS.

There may be provided a symbol-level buffer at the analog front end. Then, based on a demodulator, a symbol sequence in the buffer may be transformed to a bit sequence. This may mark the transition from symbol level to bit level. Bit level processing is then handled in digital domain by the digital front end.

For example, each symbol may encode one or more bits. The symbol may be defined by an amplitude and phase of the received signal, often represented in complex space. The number of bits per symbol may depend on the used modulation scheme. Sometimes, the number of bits per symbol is referred to as bit loading. The bit loading may depend on the used constellation. It would be possible that different parts of WUSs employ different bit loading.

In the various examples described herein, time-domain and/or frequency-domain processing is employed to identify the WUS 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the WUS by the digital front end 1369 may be comparably simple—e.g., if compared to processing of a paging indicator. In legacy LTE, once the UE is scheduled a PO, i.e., allocated to listen to a paging indicator, the UE is expected to be ready to decode a physical downlink control channel (PDCCH). Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the WUS may be transmitted independent of the PDCCH. Dedicated resources may be allocated to the WUS. The WUS may be transmitted prior to the UE accessing the PDCCH. Once the UE has detected a WUS that is assigned to that UE, then the UE may start to decode the PDCCH.

The WUS and the paging signal may employ different physical channels 261, 262. The WUS may not include reference to the P-RNTI—included in the paging signal—for UE-specific identification. The WUS may be designed so that it requires less UE computation/calculation than reception and decoding of the paging signal.

For example, with respect to the WUS, it may not be preferred to have channel coding such turbo code, convolutional code, etc. The WUS can be a robust signal, such that does not operate with higher order modulation. It can be a lower order modulation, such as On-Of-Keying (OOK), BPSK. The WUS may employ a modulation scheme that has low peak to average power ratio property. The WUS, specifically a part of the WUS related to a UE, can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the WUS 4003 was addressed to the particular UE 130 and possibly further UEs. Based on said cross correlating, it is then possible to selectively transition the main receiver 1351 from an inactive state to an active state.

By means of spreading and/or scrambling of the base sequence, more reliable cross correlation can be performed. For example, by spreading the base sequence, a longer sequence is obtained for the WUS 4003 transmitted over the air. Longer sequences generally are more robust to false positives when performing the cross correlation.

In some examples, different processing may be employed for WUSs received in different cells. The processing may be set in accordance with sequence design configurations indicated by configuration data for multiple cells.

Figure 10:
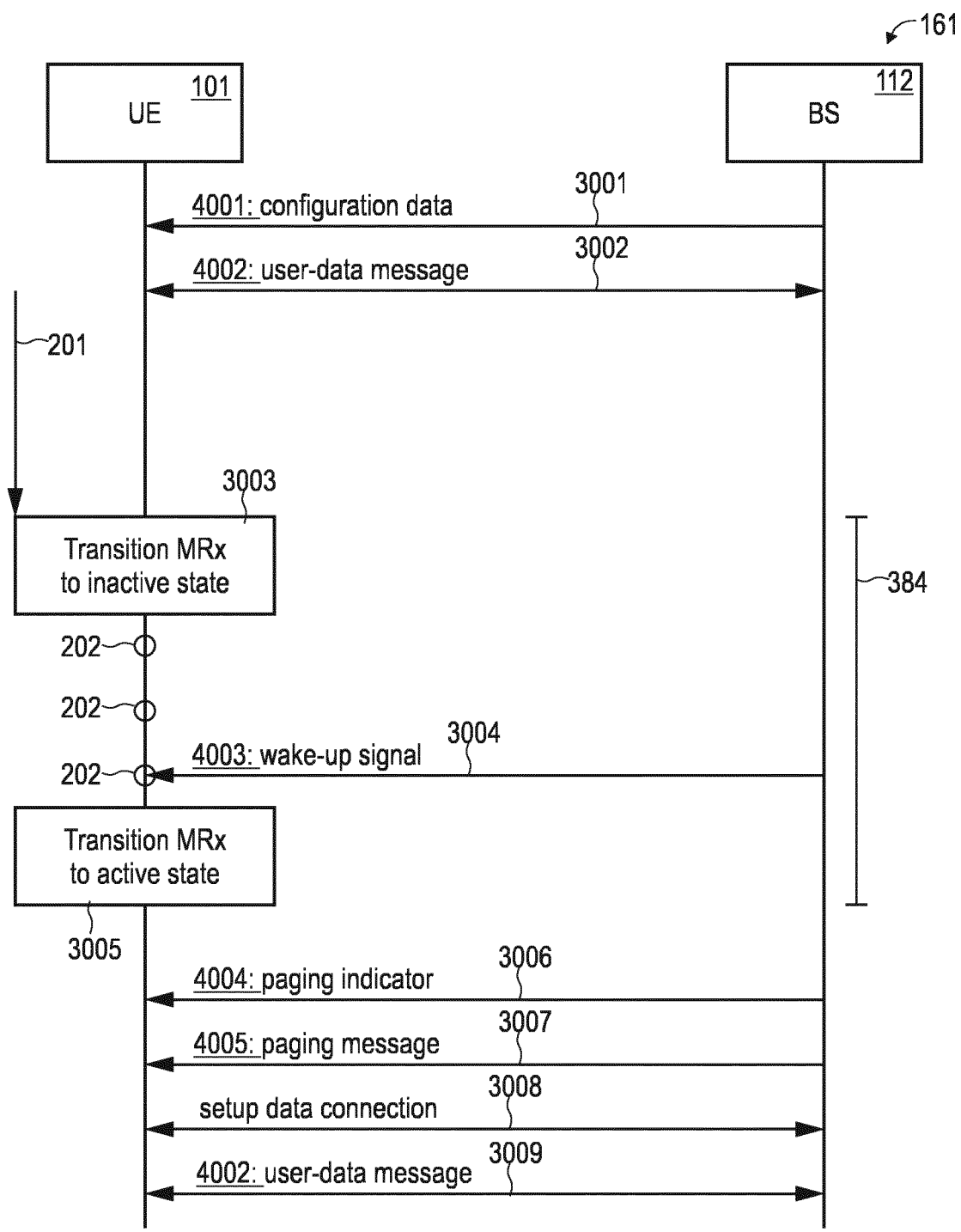
FIG. 10 is a signaling diagram of signaling between the UE and a BS of a cell according to various examples.

FIG. 10 is a signaling diagram. FIG. 10 illustrates aspects with respect to communicating between the UE 101 and the BS 112 of the cell 161. FIG. 10 relates to a scenario without UE mobility. FIG. 10 illustrates aspects with respect to transmitting and/or receiving (communicating) a WUS 4003. According to the various examples described herein, such techniques as described with respect to FIG. 10 may be employed for communicating WUSs 4003. In particular, FIG. 10 also illustrates aspects with respect to the inter-relationship between communication of a WUS and communication of paging signals and messages 4004, 4005 that may be employed in the various examples described herein.

At 3001, configuration data 4001 is communicated. The configuration data 4001 is transmitted by the BS 112 and received by the UE 101. For example, a respective control message may be communicated on the control channel 262, e.g., PDCCH. For example, the control message may be a Layer 2 or Layer 3 control message. The control message may be relate to RRC/higher-layer signaling. For example, the configuration data 4001 may be broadcasted, e.g., in a system information block of the cell 161; here, PDSCH may be used. A mapping index may be used which is indicative of a configuration for WUS transmission selected form a predefined set of candidate transmissions.

The configuration data 4001 may be for WUS transmission in multiple cells 161-168 of the network 100. Specifically, the configuration data may be for WUS transmission in the serving cell 161 of the BS 112 transmitting the configuration data 4001; and at least one further cell 162-168. For example, the serving cell 161 and the at least one further cell 162-168 may define the tracking area 160 of the cellular network.

The configuration data 4001 may be indicative of support of WUS transmission of each one of the serving cell 161 and the at least one further cell 162-168.

The configuration data 4001 may be indicative of time-frequency resources used for the WUS transmission in the serving cell 161 and the at least one further cell 162-168. The configuration data 4001 may be indicative of a schedule of the time frequency resources. The schedule may be indicative of a time pattern of the time-frequency resources and/or indicative of a frequency pattern of the time-frequency resources. Here, it would be possible that at least one of the time pattern and the frequency pattern varies between the serving cell 161 and the at least one further cell 162-168, to reduce inter-cell interference. The schedule may be defined with respect to paging signal transmission in the serving cell 161 and/or the at least one further cell 162-168. It would also be possible that the schedule is defined with respect to another time reference, e.g., transmission frames, other control signals, etc.

The configuration data 4001 may be indicative of the sequence design configuration of WUS transmission of each one of the serving cell 161 and the at least one further cell 162-168. This facilitates cell-specific decoding and/or demodulation. For example, the configuration data 4001 may be indicative of a modulation and/or coding scheme (MCS) of the WUS transmission in the serving cell 161 and the at least one further cell 162-168. For example, the configuration data 4001 may be indicative of a length of the base sequence used for the WUS transmission in the serving cell 161 and the at least one further cell 162-168.

Thereby, it becomes possible to dynamically adjust the sequence design configuration for the WUS transmission across the various cells 161-168 of the network.

At 3002, a user-data message 4002 is communicated. For example, the user-data message 4002 may be communicated on the payload channel 263. For example, the user-data message 4002 may be communicated along the data connection 189, e.g., as part of a bearer, etc.

4001 and 4002 are communicated with the main receiver 1351.

Then, there is no more data to be communicated between the UE 101 and the BS 112. Transmit buffers are empty. This may trigger a timer. For example, the timer may be implemented at the UE 101. After a certain timeout duration set in accordance with the inactivity schedule 201, the main receiver 1351 of the UE 101 is transitioned into the inactive state 384 from the active state, 3003. This is done in order to reduce the power consumption of the UE 101. For example, prior to the transitioning the main receiver 1351 to the inactive state 384, it would be possible to release the data connection 189 by appropriate control signaling on the control channel 262 (not illustrated in FIG. 10). The timeout duration 201 is an example implementation of a trigger criterion for transitioning into the inactive state 384; other trigger criteria are possible. For example, a connection release message may be communicated.

Multiple WOs for communicating the WUS 4003 are then implemented by reoccurring resources 202. For example, the resources 202 may be radio resources defined in a time-frequency grid used for communication with the main receiver 1951; this avoids interference with further UEs communicating with the BS 112. The WOs may be arranged in paging frames or in another relationship with POs.

At some point in time, the BS 112 transmits a WUS 4003, 3004. This may be because there is DL data—e.g., payload data or control data—scheduled for transmission to the UE 101 in a transmit buffer. Another trigger criteria for transmitting the WUS 4003 are conceivable. For example, at least a cell-related part of the WUS 4003 may be transmitted repeatedly or, generally, according to a timing pattern. The WUS 4003 is received by the UE 101. This WUS transmission is in accordance with the configuration data 4001 for the serving cell 161.

In response to receiving the WUS 4003, the main receiver 1351 of the UE 101 is transitioned to the active state, 3005.

Then, at 3006, a paging indicator 4004 is transmitted by the BS 112 to the UE 101. The paging indicator 4004 is received by the main receiver 1351. For example, the paging indicator may be transmitted on channel 262, e.g. PDCCH. For example, the paging indicator may include a temporary or static identity of the UE 101. The paging indicator or may be indicative of a plurality of UEs, because the indicator may be derived from unique identities of the UEs such as the International Mobile Subscriber Identity (IMSI) or the like in an ambiguous manner.

The paging indicator 4004 may include information on a MCS used for communicating a paging message 4005 at 3007. The paging message 4005 may be communicated on a shared channel 263, e.g., physical downlink shared channel (PDSCH). Generally, the paging indicator 4004 and the paging message 4005 may be communicated on different channels. The paging message 4005 may be modulated and encoded according to the MCS indicated by the paging indicator 4004. Thus, it may be required that the UE 101 receives, firstly, the paging indicator 4004 and, secondly, the paging message 4005.

Then, at 3008, a data connection 189 is set up between the UE 101 and the BS 112. This may include a random access procedure and a RRC set up.

Finally, a UL or DL user-data message 4002 is communicated using the newly set up data connection 189 at 3009.

As will be appreciated from FIG. 10, upon transitioning the main receiver 1351 to the active state at 3005, the data connection 189 needs to be re-established. For this reason, the UE 101 operates in idle mode—when no data connection 189 is set up or maintained—during the inactive state 384 of the main receiver 1351. However, in the various examples described herein, other implementations of the particular mode in which the UE 101 operates during the inactive state 384 are conceivable.

Figure 11:
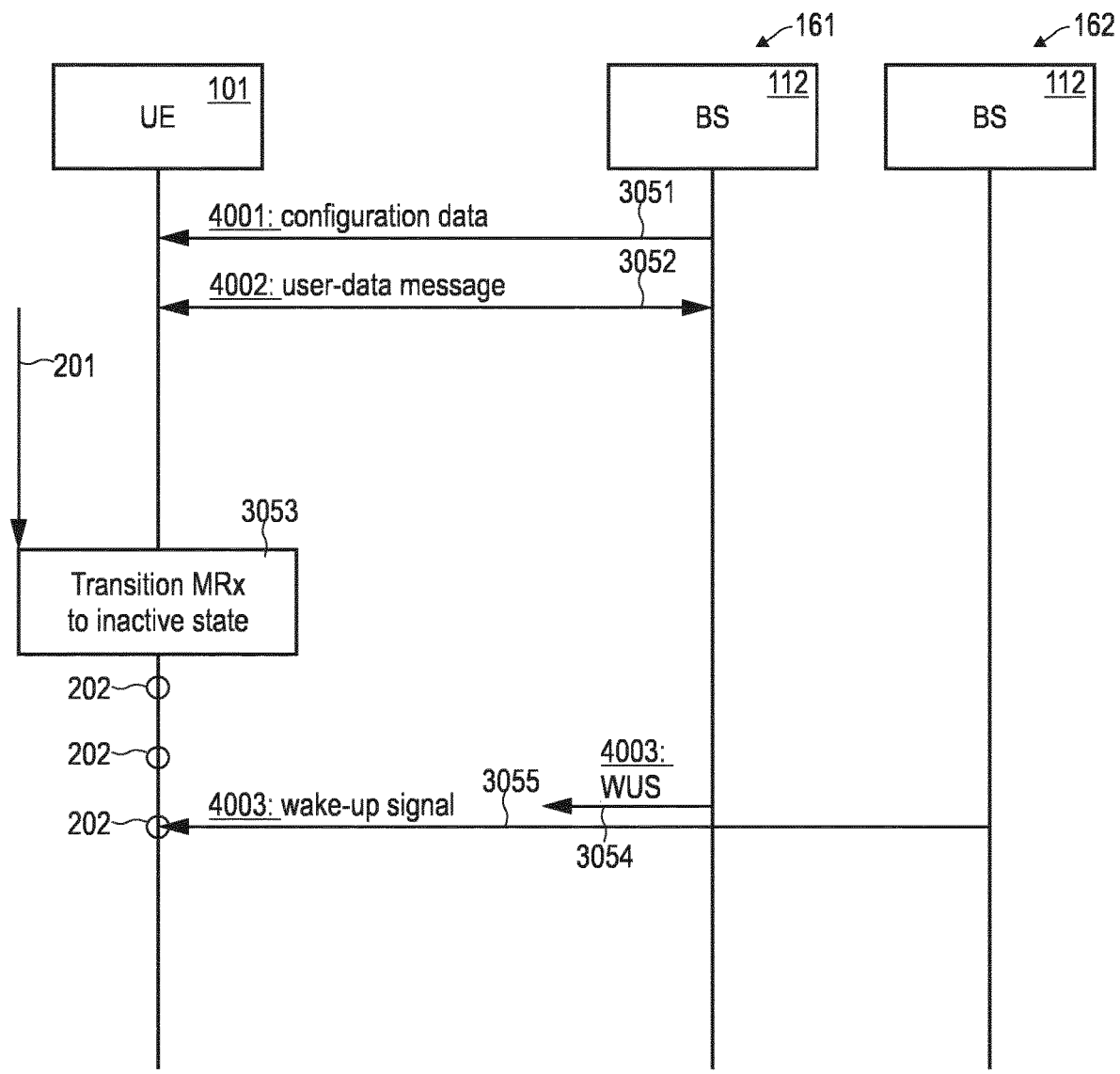
FIG. 11 is a signaling diagram of signaling between the UE and the BS of the cell and a BS of a further cell according to various examples.

FIG. 11 is a signaling diagram. FIG. 11 illustrates aspects with respect to communicating between the UE 101, the BS 112 of the cell 161, and the BS 112 of the cell 162. FIG. 11 relates to the scenario with UE mobility. FIG. 11 illustrates aspects with respect to communicating a WUS 4003.

3051 corresponds to 3001. 3052 corresponds to 3002. 3053 corresponds to 3003.

Then, UE mobility occurs. Hence, the UE 101 moves from the cell 161 to the cell 162. Thus, the UE 101 is not able to receive a WUS 4003 transmitted, at 3054, by the BS 112 of the cell 161.

Then, the UE 101—in accordance with the configuration data 4001 received at 3051 for the WUS transmission in the cell 162—listens for the WUS transmission in the cell 162. The UE 101 receives the WUS 4003 transmitted by the BS 112 of the cell 162 at 3055. Based on a receive property of the WUS 4003 received at 3055, the UE 101 may implement channel sensing for a channel between the BS 112 of the cell 162 and the UE 101; hence, the UE 101 may estimate a corresponding channel quality. This may be facilitated by the WUS 4003 transmitted by the BS 112 of the cell 162 at 3055 including a reference signal for channel sensing. For example, a first part of the WUS 4003 communicated at 3055 may include the reference signal. Then, depending on the channel quality, the UE 101 may decide to camp on the cell 162 and continue to receive an information block broadcasted by the BS 112 of the cell 162; or may decide that the channel quality is insufficient and continued to listen for WUS transmission in other cells 163-168 (not illustrated in FIG. 11).

As will be appreciated, such a channel sensing scenario according to FIG. 11 is facilitated by a cell-related part of the WUS 4003. Specifically, it is possible that—at each WO—the UE 101 checks whether any WUS 4003 can be received from the serving cell 161, e.g., whether a cell-related part of the WUS 4003 transmitted by the BS 112 of the serving cell 161 can be received; only if it is not possible to receive any WUS 4003 from the serving cell 112, the UE 101 may commence with attempting to receive a WUS from another cell 162-168, e.g., again a cell-related part of a WUS 4003. In detail, in the scenario of FIG. 10 and FIG. 11, the UE 101 may receive a respective reference signal included in a WUS 4003 for each WO from the BS 112 from the originally serving cell 161 (not illustrated in FIGS. 10 and 11 for sake of simplicity), until mobility occurs.

Figure 12:
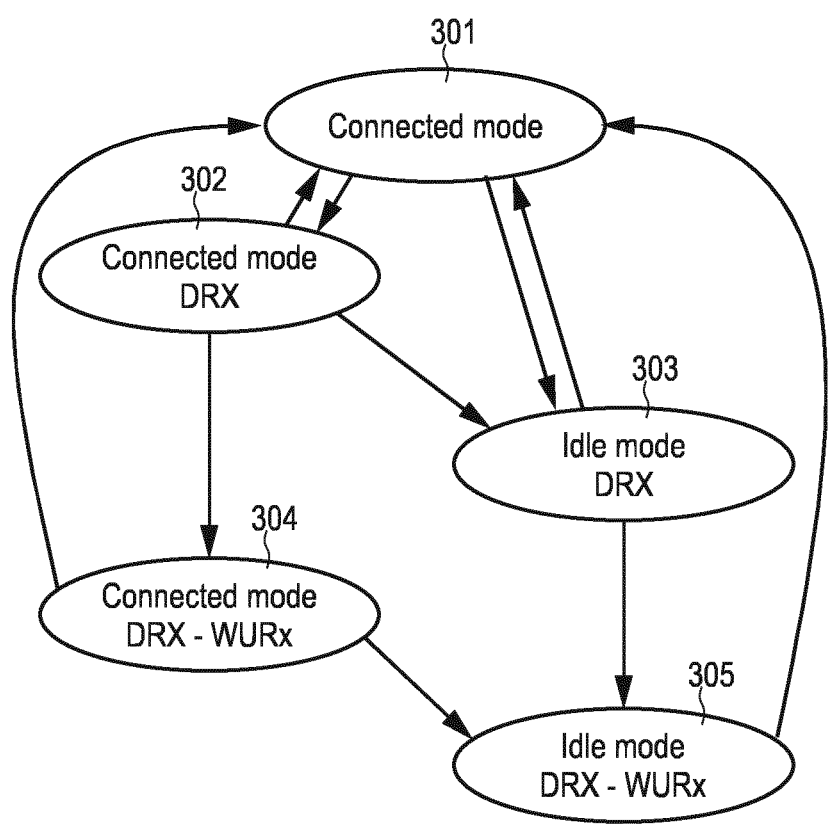
FIG. 12 schematically illustrates modes in which the UE can be operated according to various examples.

FIG. 12 illustrates aspects with respect to different modes 301-305 in which the UE 101 can operate. FIG. 12 also illustrates aspects with respect to association of communication of WUSs and paging signals with the various modes 301-305. In the various examples described herein, it is possible that the WUSs are communicated in certain operational modes 304, 305 of the UE 101.

Example implementations of the operational modes 301-305 are described, e.g., in 3GPP TS 38.300, e.g., version 15.0.

During connected mode 301, a data connection 189 is set up. For example, a default bearer and optionally one or more dedicated bearers may be set up between the UE 101 and the network 100. The main receiver of the UE 101 may persistently operate in an active state. In order to reduce the power consumption, it is then possible to transition from the connected mode 301 to a connected mode 302 which employs a DRX cycle of the main receiver 1351. The DRX cycle includes on durations and off durations. During the off durations, the main receiver 1351 is unfit to receive data; an inactive state may be activated. The timing of the DRX cycle is synchronized between the UE 101 and the BS 112 such that the BS 112 can align any DL transmission with the on durations of the connected mode DRX cycle. The data connection 189 is maintained set-up in mode 302.

To achieve a further power reduction, it is possible to implement in idle mode 303. The idle mode 303 is, again, associated with the DRX cycle of the main receiver 1351 of the UE 101. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state. The low-power receiver 1352 is not required.

In the example of FIG. 12, two more modes 304, 305 are illustrated. Both modes 304, 305 relate to scenarios where the main receiver 1351 is operated in the inactive state 384. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304, the data connection 189 is maintained between the UE 101 and the network 100. For example, respective registry entries may be maintained by the UE 101 and the network 100, e.g., at a core-network mobility node such as the AMF 131. Transition into mode 304 may be determined by the inactivity schedule 201. In mode 304, it would be possible that a further signal which is communicated in response to communicating the WUS directly encodes a user-data message associated with the data connection 189. No random access procedure is required. Generally, the mode 304 is optional.

Differently, in the mode 305, the data connection 189 is not maintained between the UE 101 and the network 100. A random access procedure, triggered by paging, may be required (cf. FIG. 10).

The modes 304, 305 are WUS modes 304, 305. Some cells may support mode 304, while other cells may support mode 305, while still further cells may support both mode 304 and mode 305. As a general rule, different cells may support different WUS modes 304, 305.

In the example of FIG. 12, scenarios are illustrated in which both low-power receiver modes 304, 305 implement a DRX cycle of the low-power receiver 1532. Hence, the WUS 4003 is communicated in accordance with the timing of the DRX cycle. However, generally, it would also be possible to implement the modes 304, 305 such that the low-power receiver 1352 is persistently fit to receive WUSs, i.e., does not implement on durations and off durations.

Figure 13:
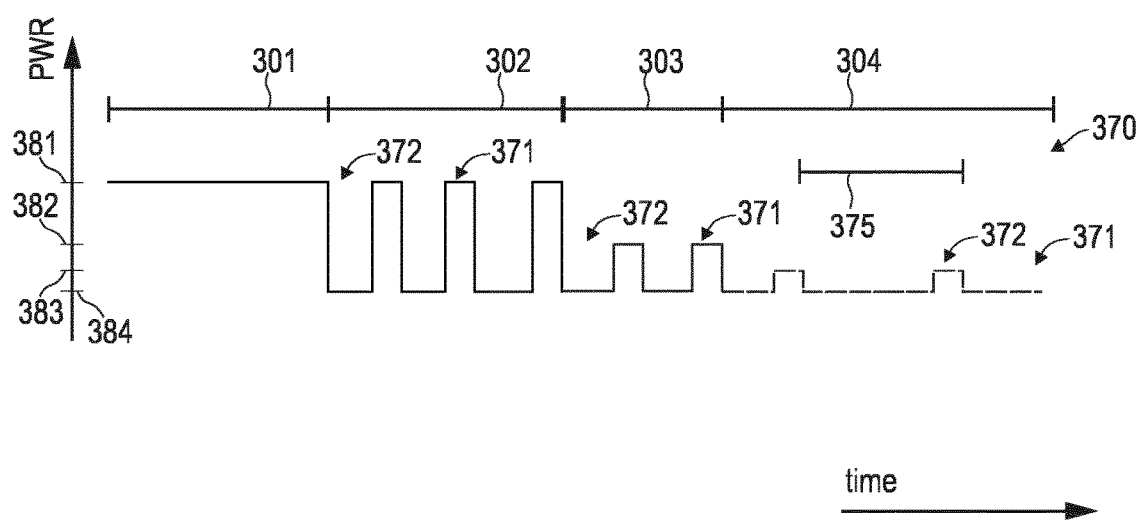
FIG. 13 schematically illustrates operation of a receiver of the UE in different states according to a discontinuous reception cycle and according to the modes according to various examples.

FIG. 13 illustrates aspects with respect to switching between the different modes 301-305. Furthermore, FIG. 13 illustrates aspects of employing DRX cycles 370. It is possible to employ such techniques in the various examples described herein with respect to communication of WUSs.

First, the UE 101 operates in the connected mode 301. This causes a persistent power consumption at a high level, because the main receiver 1351 persistently operates in the active state 381. The active state 381 is associated with a certain power consumption. Then, in order to reduce the power consumption, the connected mode 302 employing DRX is activated. Here, the on durations 371 and the off durations 372 of the main receiver 1351—selectively operating in the active state 381 and the inactive state 384—are illustrated.

To further reduce the power consumption, next, the idle mode 303 is activated. This is accompanied by releasing the data connection 189. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351, now operating in the active state 382, can be reduced if compared to the connected mode 302. During idle mode 303 when in active state 382, the main receiver 1351 only expects reception of paging signals. The on durations 371 are aligned with POs.

Finally, to even further reduce the power consumption, the idle mode 305 is activated. Upon transitioning into the idle mode 305, the main receiver 1351 is persistently transitioned from the active states 381, 382 to the inactive state 384. A DRX cycle 370 is again implemented including on durations 371 and off durations 372 according to a DRX cycle length 375; here the on durations 371 are aligned with WOs. The DRX cycle is implemented by switching the low-power receiver 1352 between the active state 383 and the inactive state 384 (dashed line in FIG. 13).

The various states 381-384 are examples only. For illustration, it would be possible that the main receiver is not transitioned into the fully inactive state 384 when in DRX connected mode 302; rather, in the OFF durations 372, an intermediate state between 381 and 384 could be assumed.

Figure 14:
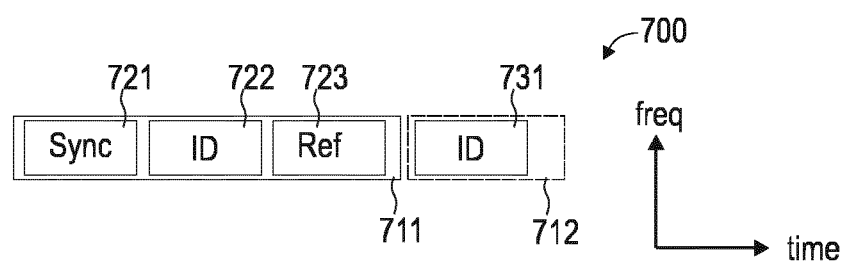
FIG. 14 schematically illustrates a WUS including a cell-related first part and a UE-related second part according to various examples.

FIG. 14 illustrates aspects with respect to a WUS 700. The WUS 700 includes a first part 711 and a second part 712. In the example of FIG. 14, the first and second parts 711, 712 occupy the same frequency and are transmitted in immediate succession.

The first part 711 may be related to the cell 161-168 associated with the BS 112 transmitting the WUS 700. Differently, the second part 712 may be related to one or more UEs 101 to which the WUS 700 is addressed. Generally, the second part 712 is optional.

For example, the first part 711 and the second part 712 may share a common checksum. As such, the checksum may be based, both, on data of the first part 711 and data of the second part 712. This reduces overhead.

For example, it would be possible that the first part 711 of the WUS 700 includes a synchronization signal 721 for time-frequency synchronization of the BS 112 and the UE 101. Properties of the synchronization signal 721 may be indicated by the configuration data 4001 for multiple cells 161-168.

The first part 711 of the WUS 700 may also include a reference signal 723 for channel sensing of the channel between the BS 112 and the UE 101. Properties of the reference signal—e.g., a signal form symbol sequence, transmit power, etc.—may be indicated by the configuration data 4001 for multiple cells 161-168.

Alternatively or additionally, it would be possible that the first part 711 of the WUS 700 includes a cell identity 722 of a cell 161-168 associated with the BS 112 transmitting the WUS 700. In some scenarios, the cell identity 722 may be encoded into the synchronization signal 721 and/or the reference signal 723. Based on the cell identity, it is possible to track mobility of the UE 101. For example, the identifier used for indicating the cell identity may be in accordance with a respective identifier included in the configuration data 4001.

As will be appreciated from the above, the synchronization signal 721, the reference signal 723, and the cell identity 722 are all not specific to the UE 101 as intended recipient of the WUS 700. As such, the first part 711 is related to the cell of the BS 112 transmitting the WUS 700; rather than to the UE 101 as intended recipient. This is different for the second part 712. This facilitates implementing mobility measurements such as channel sensing at a given UE based on the first part 711.

There may be a tendency to implement mobility measurements primarily or exclusively using the first part 711.

Illustrated in FIG. 14 is a scenario in which the second part 712 of the WUS 700 includes an identity 731 of one or more UEs. This helps to address individual UEs or a group of UEs in connection with a potential subsequent paging signal 4004. As, such the second part 712 may be related to one or more UEs.

For generating the first part 711 of the WUS 700, techniques as described in connection with FIG. 8 can be employed. Likewise, for generating the second part 712 of the WUS 700, techniques described in connection with FIG. 8 may be employed. Different sequence design configurations may be selected for the different parts 711, 712. For example, a cell-specific base sequence may be selected when generating the first part 711; while a UE-specific base sequence may be selected when generating the second part 712. It would be possible that the length of the base sequence, the number of CRC bits, the spreading factor, the particular type of sequence generator used, etc.—or generally, the sequence design—is selected differently for the first part 711 and for the second part 712. Specifically, it would be possible that a more robust sequence design configuration is selected for the first part 711 if compared to the second part 712, in order to enable reliable reception of the first part 711 even prior to obtaining synchronization between the UE 101 and the BS 112.

In FIG. 14 a scenario is illustrated in which a distinct synchronization signal 721 and a distinct reference signal 723 is included in the WUS 700. In other examples, it would be possible that synchronization and channel sensing are facilitated by the reference signal included in the WUS 700. In such example, the preamble—i.e., the first part 711 of the WUS 700—may consist of a reference signal only, which provides means for synchronization and channel sensing.

As a general rule, the multi-cell configuration data 4001 may cover the first part 711 and/or the second part 712. Where the multi-cell configuration data 4001 is primarily used for mobility measurements, it may be sufficient to cover the first part 411, to limit control signaling overhead.

Figure 15:
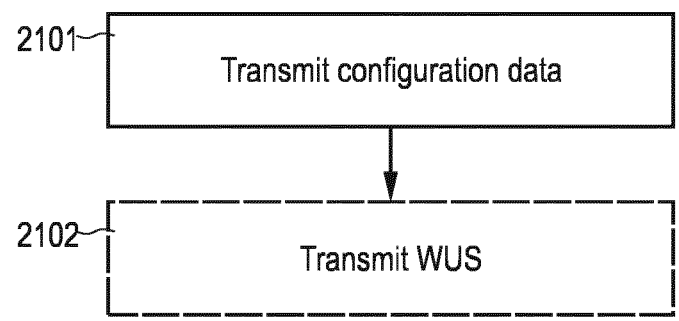
FIG. 15 is a flowchart of a method according to various examples.

FIG. 15 is a flowchart of a method according to various examples. For example, the method according to FIG. 15 could be executed by the control circuitry 1122 of the BS 112 (cf. FIG. 4).

At block 2101, configuration data is transmitted, e.g., the configuration data 4001 (cf. FIG. 10 and FIG. 11). The configuration data is transmitted for WUS transmission in the cell associated with the transmitting BS; as well as for WUS transmission in at least one further cell of the respective cellular network. For example, the configuration data may be broadcasted, e.g., as part of an information block. It would also be possible that the configuration data is transmitted in a UE-specific control message, e.g., using a respective control channel between the BS and the UE.

For transmitting the configuration data, an index mapping with a plurality of candidate configurations may be implemented, to thereby reduce overhead.

The configuration data may be selectively for one or more parts of a multi-part WUS. For example, the configuration data may cover any cell-related part of a WUS; but may not cover any UE-related part of the WUS.

Next, at optional block 2102, a WUS is transmitted, in accordance with any configuration indicated by the configuration data. For example, a two-part WUS including a first part related to the respective cell and the second part related to the UE being paged may be transmitted (cf. FIG. 14). Generally, block 2102 is optional. In some scenarios, the transmitted WUS may not include a part related to a UE; but may comprise a cell-related part. The cell-related part may include a reference signal. Thereby, any receiving UE—which is not necessarily being paged—may be able to track mobility by listening for the respective WUS transmission. Mobility measurements including channel sensing are facilitated.

Figure 16:
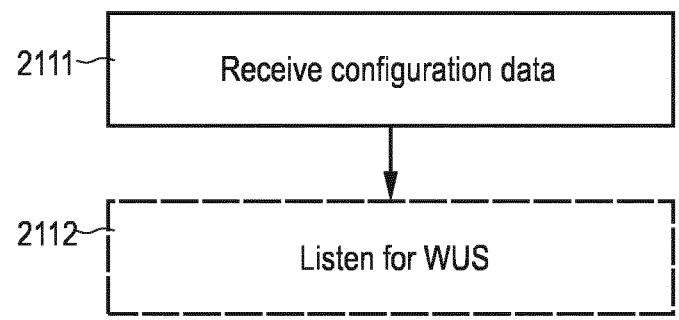
FIG. 16 is a flowchart of a method according to various examples.

FIG. 16 is a flowchart of a method according to various examples. For example, the method according to FIG. 16 may be executed by the control circuitry 1012 of the UE 101. At block 2111, configuration data is received. As such, block 2111 is inter-related with block 2101 (cf. FIG. 15).

Next, at optional block 2112, the UE listens for a WUS transmission. This may be in accordance with the DRX cycle of the respective UE. Furthermore, listening for the WUS may be in accordance with the configuration data. Specifically, it would be possible to listen for WUS transmission of a plurality of cells for which the configuration data is indicative of support of WUS transmission and optionally the configuration of the associated WUS transmission.

Specifically, it would be possible that at block 2112, a two-part WUS is employed, wherein the WUS includes a cell-related first part and a UE-related second part. For the purpose of mobility measurements, it is sufficient to listen for and receive the first part of the WUS. If wakeup of the respective UE should be implemented, then listening for and reception of the second part may be required.

For example, the configuration data received in 2111 may be indicative of whether the various cells—e.g., identified by a cell identity—support WUS transmission. Then, the attempt to listen for a WUS of a given cell may be restricted in accordance with this indication of support of the WUS transmission.

For example, the configuration data received in block 2111 may be indicative of the time-frequency resources used for the WUS transmission in the various cells. Listening for the WUS transmission in block 2112 may be implemented in accordance with the respectively indicated time-frequency resources of the various cells. For example, a schedule including a time pattern and/or a frequency pattern of the time-frequency resources may be indicated by the configuration data. The schedule may provide for repetitive time-frequency resources. Then, in accordance with this repetition schedule, the listening for the WUS at 2112 can be aligned with the on durations of the respective DRX cycle, if required (cf. FIG. 13).

As a general rule, the UEs may make different use of any WUSs received at block 2112 for various cells. Mobility measurements can be supported. A respective scenario is illustrated in connection with FIG. 17.

Figure 17:
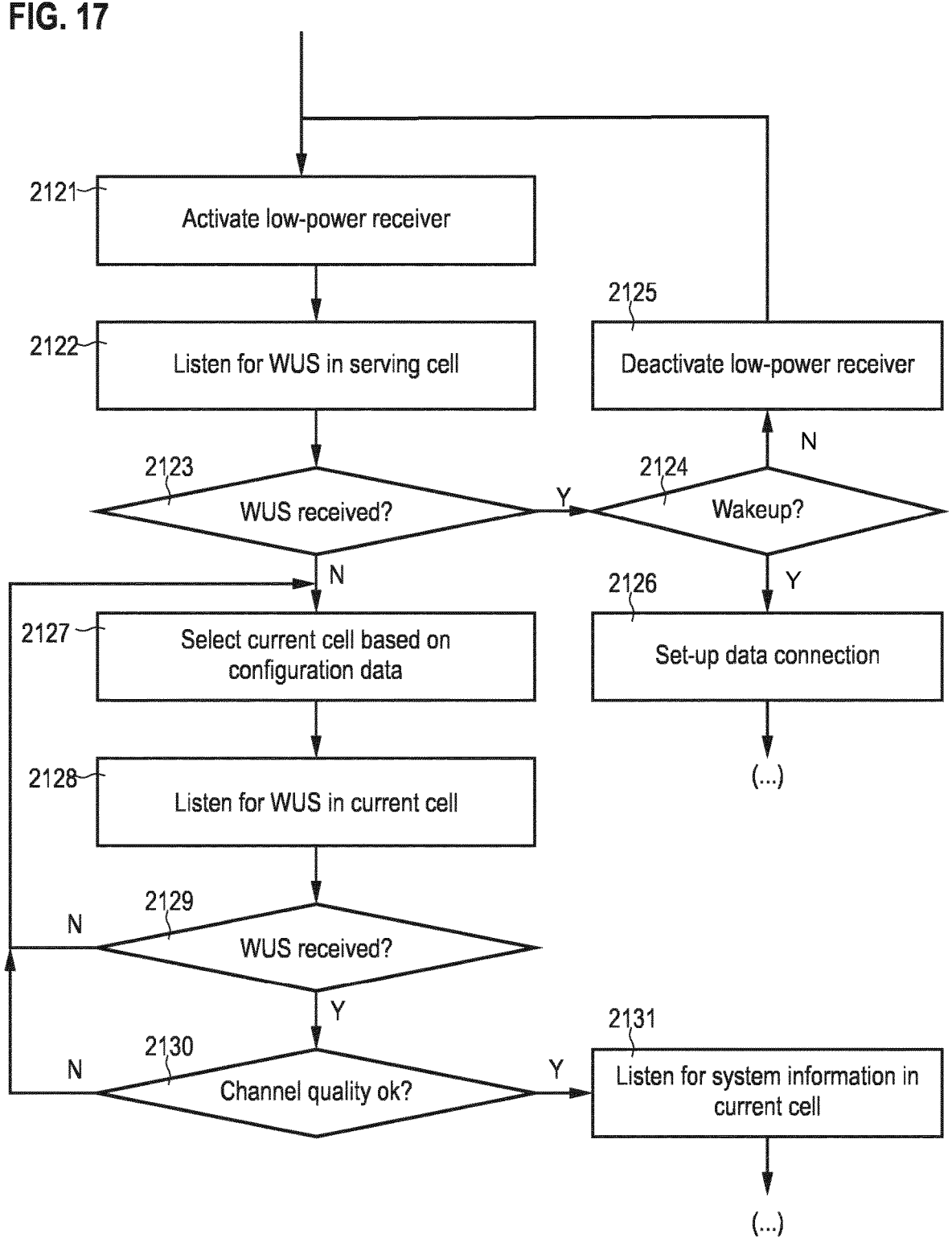
FIG. 17 is a flowchart of a method according to various examples.

FIG. 17 is a flowchart of a method according to various examples. For example, the method according to FIG. 17 may be executed by the control circuitry 1012 of the UE 101.

At block 2121, the low-power receiver 1352 is activated, e.g., in accordance with the respective DRX cycle 370 (cf. FIG. 13). This may correspond to a WO (cf. FIG. 10 and FIG. 11).

Next, at block 2122, the UE 101 listens for a WUS transmission in the serving cell 161. Thus, the UE 101 attempts to receive and process—e.g., in accordance with the techniques described in FIG. 9—a WUS 700, 4003 transmitted by the BS 112 of the serving cell.

For example, the UE 101 may attempt to receive a cell-related first part 711 of the WUS 700, 4003, at block 2122. This first part 711 may enable the UE 101 to perform mobility measurements, e.g., to identify whether mobility has occurred or whether the UE 101 is still camping on the serving cell 161. Optionally, the UE 101 may also listen for a UE-related second part 712 of the WUS 700, 4003; thereby, wakeup of the UE 101 may be facilitated, e.g., to establish the data connection 189 and preparation of transmission of a user-data message 4002.

Next, at block 2123 it is checked whether the WUS 700, 4003 has been received. This decision may be based on a cell-related part of the WUS, if any.

If it is judged that a WUS has been received, then, at block 2124, it is checked whether the UE is being paged by the network 100. This may involve analyzing a UE-related second part 712 of the WUS 700, 4003. Alternatively or additionally, a paging signal and/or a paging message may be received (cf. FIGS. 10 and 11).

If the UE is not being paged, then, at 2125, the low-power receiver 1352 is deactivated again, to reduce power consumption. Otherwise, at block 2126, the UE continues to setup the data connection 189.

If, at block 2123, however, it is such that the WUS 700, 4003, has not been received from the serving cell 161 or the receive signal strength of the WUS 700 in the current cell is below a certain threshold, the measurement of neighbor cells commences in accordance with the configuration data 4001. Specifically, in the illustrated example, the method commences at block 2127. At block 2127, a current cell 162-168 is selected based on the configuration data 4001. For example, the configuration data 4001 may include a cell list which is indicative of the identities of a plurality of further cells 162-168 for which configuration of the WUS transmission is provided. For example, the cells 162-168 may form a tracking area (cf. FIG. 2).

Then, at block 2128, the UE continues to listen for a WUS transmission of the current selected cell 162-168. Again, as already explained in connection with block 2122, this may involve listening for a cell-related first part 711 of the WUS 700, 4003 (cf. FIG. 14). This may help to implement mobility measurements, e.g., to estimate a channel quality of a channel between the UE and the BS 112 of the current selected cell 162-168.

Listening for the WUS in the current cell in block 2128 can be implemented as explained in connection with block 2112 of FIG. 16. Hence, listening for the WUS in the current cell in block 2128 can be in accordance with the configuration data previously received. For example, the UE may listen in particular time-frequency resources indicated by the configuration data. The time-frequency resources may be indicated by means of a repetitive schedule. A timing reference may be provided by referencing to control signals such as paging signals. The timing reference may be provided with respect to POs. Any decoding attempts may be implemented in accordance with a sequence design configuration that may also be indicated by the configuration data.

Then, at block 2129, it is checked whether a WUS—e.g., a cell-related part thereof or any WUS at all—has been received in the current cell. If this is not the case, then block 2127 is re-executed, and a new current cell is selected. However, if a WUS has been received at block 2128, then, block 2130 is executed.

At block 2130, a channel quality of the channel between the UE 101 and the BS 112 of the current cell 162-168 is estimated and compared with a threshold. Based on this threshold comparison, it can be checked whether the channel quality is sufficient and, thus, the UE 101 can be considered to be in-coverage of the current cell 162-168. This facilitates the mobility measurements to track mobility of the UE 101.

If at block 2130 it is checked that the channel quality is insufficient, then block 2127 is re-executed and a new current cell is selected. Otherwise, block 2131 is executed. At block 2131, the UE 101 continues to listen for system information broadcasted by the current cell.

At some point, there may not be a new current cell available when executing 2127. This corresponds to a scenario where WUS reception failed. This may be due to low quality of any received WUS or no received WUS at all. In such a scenario, it would be possible to perform a fallback to a paging procedure. This may involve transitioning the main receiver of the UE 101 into an active state 381, 382 to commence listing for paging signals (cf. FIG. 12 and FIG. 13: mode 303). Listening for WUSs may be stopped once mode 303 has been activated.

Summarizing, above techniques of communicating configuration data for WUS transmission in a plurality of cells of a cellular network have been described. These techniques facilitate mobility measurements by the UE. Specifically, the UE is able to listen for WUSs transmitted by the various cells in accordance with the configuration data. Then, e.g., based on a cell-related part of the WUSs, the UE may implement the mobility measurements.

In the various examples described here, the WUS includes a first part and a second part. The second part may be related to one or more UEs; while the first part may implement preamble functionality to avoid robust reception of the second part. This preamble functionality may include time-domain and/or frequency domain synchronization, mobility detection based on cell identity, and/or channel sensing. As such, the first part may be the same for all UEs served by the BS of the respective cell, i.e., may be cell related.

The first part may include information related to the cell identity. For instance this could be the serving cell identity, or a sequence that is indicative of the serving cell identity. The first part is typically the same for all the UEs within the serving cell, i.e. it is cell specific. The first part is transmitted with the same periodicity as WOS.

The second part of the WUS may only be transmitted by the BS if there is DL data queued for transmission to a respective UE. If the first part is designed such that it can also be used for synchronization purposes then second part can become somehow shorter, but still can be detected non-coherently. It also implies that there is a case where the WUS with only first-part transmission, e.g. the second part does not need to be transmitted periodically. In this case, a given UE receives the first part and use it for mobility measurements.

When the UE listens for WUS transmission, i.e. monitors the channel for WUS in some pre-determined WOs, it first check the cell identity indicator by decoding the first part determines and the signal strength of the serving cell. If the level of the signal is above a certain level determined by received signal strength and the cell identity indicator is correct, as well as possible some other signal performance criterions, then the UE continues to check for the existence of the second part, to see whether wakeup is demanded by the network. If the UE detects the second part carrying a certain information related to it, it then announces that a WUS is detected and continues to receive paging signals and/or paging messages.

Although the invention has been described with reference to certain examples and embodiments, the invention is not limited by such examples and embodiments. Rather, various modifications are covered by the invention as understood from the appended claims.

For illustration, various examples have been described in which separate signals are employed for channel sensing and synchronization at the UE. However, generally, it would be possible to implement a signal that could provide means for combinations of cell identification, synchronization, and channel sensing.

Further, for example the channel sensing may in general not need a separate signal, but could be done using synchronization signal and/or reference signal. The combination of both signals can improve the channel sensing measurement accuracy. The base-station may need to inform the UE on the relative power different between these two signals, if they are transmitted separately.

For still further illustration, while above various scenarios have been described with respect to cellular networks, similar techniques may be readily applied to other kinds and types of multi-area networks in which multiple access nodes serve multiple sub-areas.

The invention claimed is:

1. A method of operating an access node of a sub-area of a communication network, comprising:
   transmitting configuration data for wake-up signal transmission in the sub-area and in at least one further sub-area of the communication network,
   wherein the further sub-area is a neighboring sub-area.

2. A method of operating a terminal, comprising:
   receiving, from an access node of a sub-area of a communication network, configuration data for wake-up signal transmission in the sub-area and in at least one further sub-area of the communication network,
   wherein the further sub-area is a neighboring sub-area.

3. The method of claim 2, further comprising:
in accordance with the configuration data: listening for the wake-up signal transmission in the at least one further sub-area.

4. The method of claim 3, further comprising:
based on said listening: estimating a channel quality of a channel between the terminal and a further access node of the at least one further sub-area.

5. The method of claim 3,
wherein the wake-up signal transmission in the at least one further sub-area comprises a reference signal.

6. The method of claim 2,
wherein the configuration data is for a first part of wake-up signals of the wake-up signal transmission in the sub-area and in at least one further sub-area of the communication network.

7. The method of claim 6,
wherein the first part of wake-up signals transmitted in the sub-area is related to the sub-area,
wherein the first part of wake-up signals transmitted in the at least one further sub-area is related to the at least one further sub-area.

8. The method of claim 6,
wherein the first part consists of a reference signal.

9. The method of claim 6,
wherein at least some of the wake-up signals of the wake-up signal transmission in the sub-area and in the at least one further sub-area comprise a second part being related to one or more terminals.

10. The method of claim 2,
wherein the configuration data is indicative of support of the wake-up signal transmission by the sub-area and the at least one further sub-area.

11. The method of claim 2,
wherein the configuration data is indicative of time-frequency re-sources used for the wake-up signal transmission in the sub-area and the at least one further sub-area.

12. The method of claim 11,
wherein the configuration data is indicative of a schedule of the time-frequency resources.

13. The method of claim 12,
wherein the schedule is indicative of a time pattern of the time-frequency resources.

14. The method of claim 12,
wherein the schedule is indicative of a frequency pattern of the time-frequency resources.

15. The method of claim 2,
wherein the sub-area and the at least one further sub-area define a tracking area of the communication network.

16. A terminal, comprising control circuitry configured to perform:
receiving, from an access node of a sub-area of a communication network, configuration data for wake-up signal transmission in the sub-area and in at least one further sub-area of the communication network,
wherein the further sub-area is a neighboring sub-area.

17. The method of claim 1,
wherein the wake-up signal transmission in the at least one further sub-area comprises a reference signal.

18. The method of claim 1,
wherein the configuration data is for a first part of wake-up signal transmission in the sub-area and in at least one further sub-area of the communication network.

19. The method of claim 18,
wherein the first part of wake-up signals transmitted in the sub-area is related to the sub-area,
wherein the first part of wake-up signals transmitted in the at least one further sub-area is related to the at least one further sub-area.

20. The method of claim 18,
wherein the first part consists of a reference signal.

* * * * *